United States Patent [19]
Cooper

[11] Patent Number: 5,222,287
[45] Date of Patent: Jun. 29, 1993

[54] METHOD OF MAKING A COMPARTMENT DOOR FOR RECREATIONAL VEHICLES

[75] Inventor: Denzil R. Cooper, Nuevo, Calif.

[73] Assignee: Fleetwood Enterprises, Inc., Riverside, Calif.

[21] Appl. No.: 963,591

[22] Filed: Oct. 20, 1992

Related U.S. Application Data

[62] Division of Ser. No. 730,547, Jul. 16, 1991, Pat. No. 5,172,519.

[51] Int. Cl.⁵ .................... B21K 21/16; B23P 17/04
[52] U.S. Cl. ...................... 29/401.1; 29/426.4; 29/434
[58] Field of Search .............. 29/401.1, 412, 426.4, 29/434, 469; 49/383, 400, 472, 476, 485, 498, 501, 502; 296/37.1, 37.6

[56] References Cited

U.S. PATENT DOCUMENTS

| | | |
|---|---|---|
| 3,332,170 | 7/1967 | Bangs . |
| 4,691,483 | 9/1987 | Anderson . |
| 4,807,397 | 2/1989 | Doan . |
| 4,810,025 | 3/1989 | Riley . |
| 4,906,033 | 3/1990 | Sargent et al. . |
| 4,974,366 | 12/1990 | Tizzoni . |
| 5,113,562 | 5/1992 | Studt ................... 29/401.1 |

Primary Examiner—Timothy V. Eley
Attorney, Agent, or Firm—Price, Gess & Ubell

[57] ABSTRACT

An assembly for enclosing an opening to a compartment in an exterior wall of a recreational vehicle is provided. A door that covers the opening to the compartment is insulated for maintaining an interior of the compartment at a temperature substantially similar to an interior of the recreational vehicle. An improved liquid sealing assembly is affixed between an interface between the door and the opening. The liquid sealing assembly includes a first elongated projection that extends along a top edge and side edges of the opening and a second complementary projection that extends along a top edge and side edges of the door. The projections induce liquid to flow along the lengths thereof to inhibit liquid from entering the compartment.

15 Claims, 3 Drawing Sheets

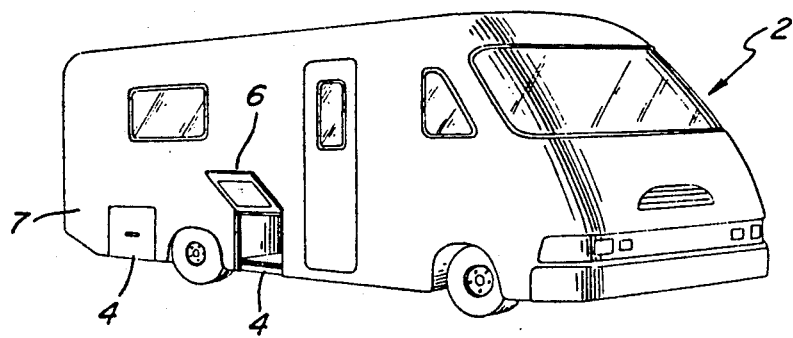
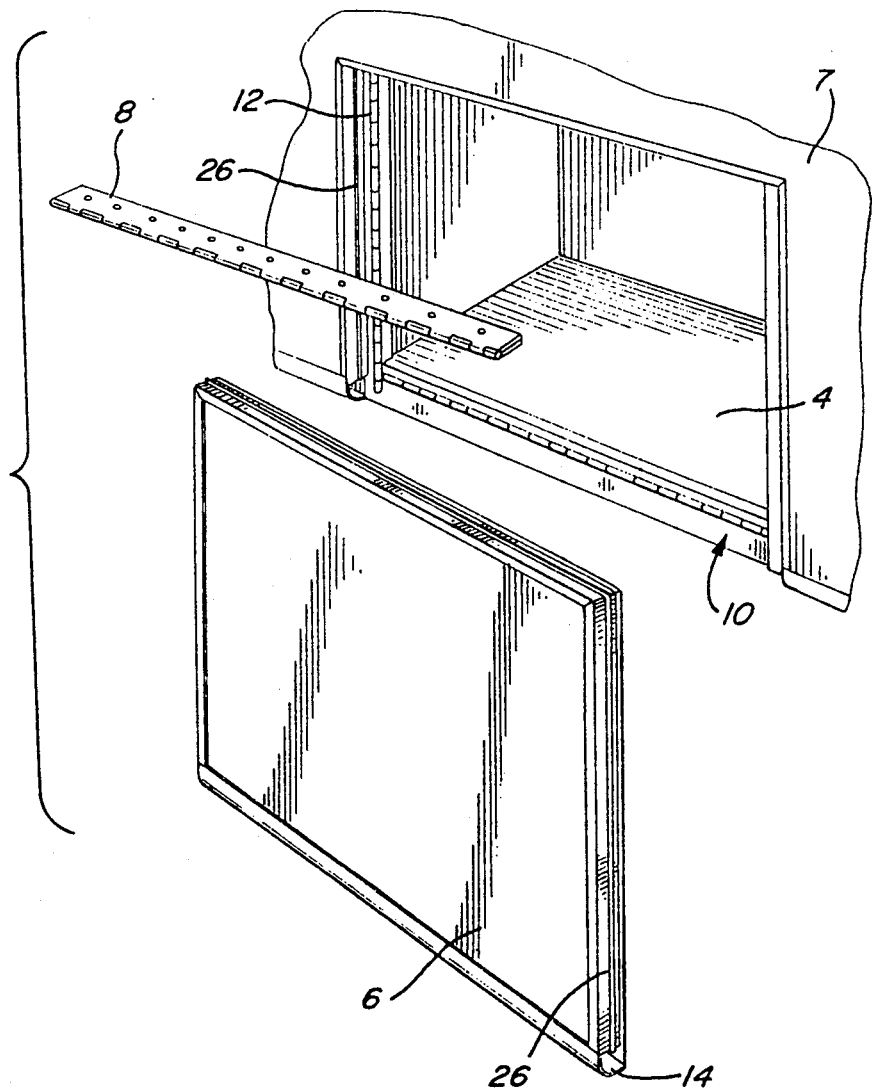

METHOD OF MAKING A COMPARTMENT DOOR FOR RECREATIONAL VEHICLES

This is a division of prior application Ser. No. 07/730,547, filed on Jul. 16, 1991 now U.S. Pat. No. 5,172,519.

BACKGROUND OF THE INVENTION

1. Field of the Invention

The subject invention relates generally to recreational vehicles and, more particularly, to a closure assembly for enclosing an opening to a compartment in an exterior wall of a recreational vehicle and a method of making the same.

2. Description of Related Art

Increasing the storage space available in recreational vehicles has long been a factor in their design. Many storage compartments are only accessible through an exterior wall of the recreational vehicle. Doors which are used to enclose openings to the storage compartments are typically made from a single thin sheet of metal, such as aluminum, or fiberglass. These doors are somewhat flimsy in construction and may become bent after repeated use.

The door used to enclose the openings to the storage compartments are sized to reside within the periphery of the opening so that an exterior surface of the door is substantially flush with the exterior wall of the recreational vehicle. Trim, such as a strip of aluminum, may be affixed around the periphery of the opening and the door for reinforcing the opening and the door. A twist latch mechanism may be use to lock a bottom edge of the door to a bottom edge of the opening.

A disadvantage of present compartment enclosing systems, is that the periphery of the doors used therewith does not snugly abut against the periphery of the opening. Water, may enter the compartment, through the interface around the periphery of the door and the opening, during adverse weather. This liquid may cause harm to items stored in the compartment.

A further disadvantage of the present compartment enclosing systems, is that the substantially thin doors do not insulate and thereby increase the heat lost from the living area. Another disadvantage is the economic waste that occurs if the compartment opening is cut from a wall panel of the vehicle.

Finally, the feel and sound of a substantial closure that is expected in higher quality vehicles is usually not provided.

SUMMARY OF THE INVENTION

It is therefore an object of the present invention to provide an improved compartment door and method of making the same for a recreational vehicle.

It is another object of the invention to provide an improved liquid sealing assembly that inhibits the flow of liquid between the compartment door and an opening in an exterior wall of the recreational vehicle.

It is another object of the invention to provide a compartment door that is insulated for maintaining an interior of a compartment at a temperature substantially similar to an interior of the recreational vehicle.

These and other objects and advantages of the present invention are achieved by providing a compartment door of an improved design. The preferred embodiment of the compartment door is insulated in the same manner as the side walls of the vehicle, since it is created from the same material.

The side wall of the vehicle is routed to cut the exact dimensions of the door. Aluminum extrusions are installed about the compartment opening and also about the perimeter of the door blank. Subsequently, bulb seals, hinges and a locking mechanism are added to finish the door and compartment opening. As can be appreciated, the door has the same structure as the side wall in the form of a fiberglass, plywood and foam core sandwich.

The compartment door also includes an improved liquid sealing assembly between an interface of the door and an opening to the compartment, when the door is in a closed position. The liquid sealing assembly further includes a first elongated projection that extends along side edges of the opening and a second complementary projection that extends along side edges of the door. The projections induce water to flow along the lengths thereof to inhibit liquid from entering the compartment.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a schematic view of a motor home with luggage compartment;

FIG. 2 is an exploded view of the luggage door hinge and compartment opening of the motor home;

DETAILED DESCRIPTION OF THE INVENTION

Figure 3:
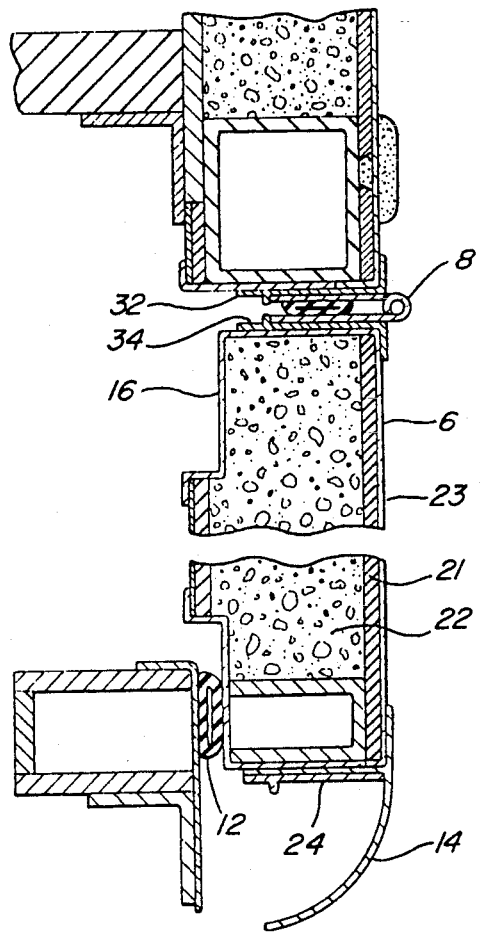
FIG. 3 is a partial side cross-sectional view luggage door and supporting frame.

The following description is provided to enable any person skilled in the recreational vehicle art to make and use the invention and sets forth the best modes contemplated by the inventor of carrying out his invention. Various modifications, however, will remain readily apparent to those skilled in these arts, since the generic principles of the present invention have been defined herein specifically to provide a relatively economical process for manufacturing a compartment door assembly with an improved structure on a production basis.

Referring to FIG. 1, a motor home or recreational vehicle 2 frequently employs storage or luggage compartments 4 along its lower exterior side surface. A door assembly 6 is conventionally utilized to close the exterior opening and to complement the exterior configuration of the recreational vehicle 2. Preferably, the door, when in a closed configuration, is relatively flush with the exterior surface of the recreational vehicle.

In manufacturing the side walls of the recreational vehicle boards of styrofoam are sandwiched and glued between plywood panels having panels of fiberglass on their exterior surfaces. This construction provides both strength and insulation properties, see the copending patent application U.S. Ser. No. 669,924 "Motor Home or Trailer Body Construction", incorporated herein by reference.

The present invention permits a portion of the recreational vehicle side wall to be directly cut in a door configuration to thereby provide the interior and exterior surfaces and insulated core of the door as a segment of the side wall. The peripheral sides of the door and the resulting side wall opening are then encapsulated with metal extrusions to respectively define the shape of the door and the opening of the storage compartment. As can be appreciated, by introducing this method of production an economy of materials is achieved and a ready matching of exterior surfaces is facilitated. Additionally, the resulting door is insulated and appears sturdy and solid to the user.

Referring to FIG. 2, an exploded view of the compartment 4 and door assembly 6 is disclosed. The door 6 represents the routed or cut blank from the side wall 7. A series of extruded aluminum segments 24 are connected about the door blank and the compartment opening to define the closure system. The door 6 is pivotally connected to an upper edge opening of the compartment 4 by an elongated hinge member 8. Extending about the opening of the compartment 4 is a liquid sealing assembly 10. The liquid sealing assembly 10 includes segments of an extruded hollow bulb seal 12. The bulb seal is preferably made of an extruded hemispherical rubber or synthetic resin material. Alternatively, an annular rubber seal (not shown) could be utilized. In production, segments of the bulb seal 10 are adhered directly to an interior parameter frame about the compartment opening. The frame member can be formed of extruded aluminum plates or segments 24 that are riveted to the vehicle.

The compartment door 6 can be basically a sheet metal or fiberglass and plywood panel structure that sandwiches a foam core, such as a styrofoam board or polyurethane expanded foam 22, to both strengthen and provide a substantial feel and operation to the door assembly. Again, extruded aluminum plates 24 can form the perimeter or side peripheral member of the door. In one preferred embodiment, 5/32 inch plywood panels 21 are glued to a styrofoam board 22. Sandwiched over the plywood panels 21 are fiberglass panels 23, for example, of 8 oz./sq.ft. to provide the exterior and interior surfaces. Alternatively, a vinyl clad panel can be used on the interior surface. As shown in FIG. 2, a lower radius molding 14 is disclosed which simply continues the lower styling trim of the recreational vehicle body.

Referring to FIG. 3, the luggage door assembly 6 includes an extended flat peripheral flange 16 to provide a bearing surface against the respective bulb sealing members 12 that are attached about the compartment opening.

Figure 4:
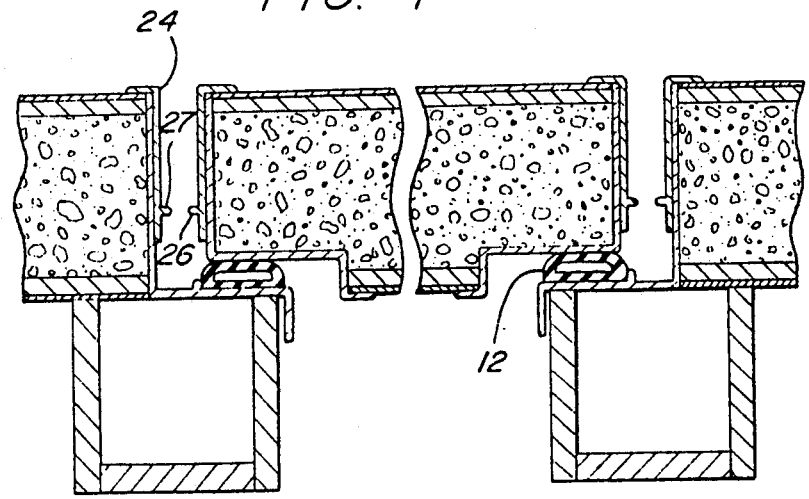
FIG. 4 is a partial cross-sectional view of a luggage door and frame.

As can be seen in FIG. 4, the extrusions 24 having cross-sectional L-configurations can also have cantilevered projections 26 that will create a rim extending parallel to the vertical exterior surface of the vehicle side. Also as shown in FIG. 4, the side wall openings also have a complementary or second cantilevered projection 27 extending along the side edges of the opening in a position opposite the first side projections 26. These projections 26 and 27 have the capacity of inhibiting the inflowing of liquid prior to contact of the liquid with the bulb seal 12. The opening between the side edges of the door and wall is about ⅜ of an inch and the respective projections are each about 1/16 of an inch. Since turbulent air flow patterns are created by the movement of the vehicle, the projections 26, 27 are believed to disturb the pressure forces and to provide a physical barrier to contact any raindrops and to direct them to flow downward. Thus, physical barriers are provided along the edges of the opening and the side edges of the door to improve the sealing capabilities of a compartment door structure. Additionally, the positioning of the side or vertical bulb seals 12 are immediately adjacent the opening of the compartment and are supported by appropriate trusses in the wall to provide both the feel and sound of a substantial closure structure.

Figure 5:
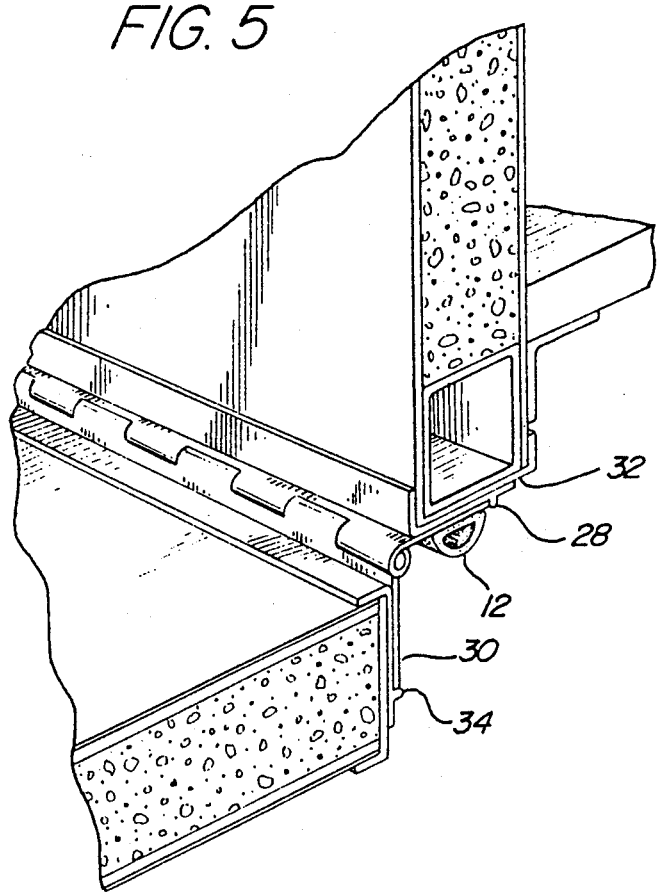
FIG. 5. is a schematic partial cross-sectional perspective view of the door and frame.
Figure 6:
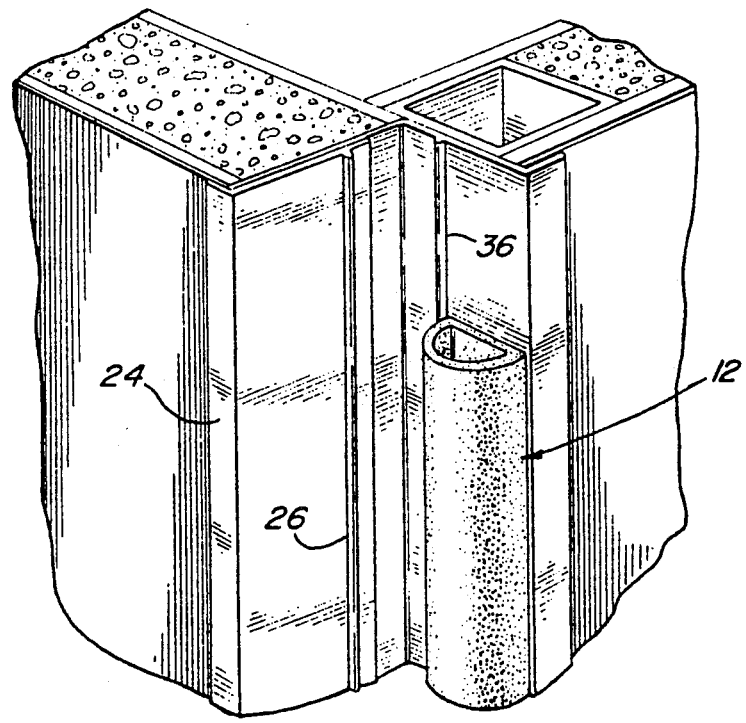
FIG. 6 is a schematic cross-sectional perspective view of one side of the opening of the compartment.

As can be seen in FIG. 5, the bulb seal 12 can be positioned intermediate the respective hinge arms 28 and 30 of the hinge member 8. The hinge arms 28 and 30 can be seated against extruded rims 32 and 34. Extruded rims 36 can also be provided on the extrusion members for further alignment of the bulb seals 12.

Various forms of locking mechanisms that are known in the art can be utilized to secure the door 6 and, since they do not form an immediate part of the present invention, descriptions will be omitted for purposes of brevity. Preferably, the locking mechanism is appended on the inside surface of the door 6 to maintain the integrity of the door structure as a removed segment of the vehicle side wall.

Those skilled in the art will appreciate that the above-described preferred embodiment is subject to numerous modifications and adaptations without departing from the scope and spirit of the invention. Therefore, it is to be understood that, within the scope of the appended claims, the invention may be practiced other than as specifically described herein.

What is claimed is:

1. A method of forming a closure assembly for a storage space in a recreational vehicle comprising the steps of:
   forming a side wall of a recreational vehicle having a sandwich construction of internal and external panels adhering to an intermediate core for strength and insulation;
   cutting a door blank out of the formed side wall at a predetermined location for a storage space;
   providing perimeter extrusions to enclose the opening in the side wall;
   providing perimeter extrusions about the door blank to encapsulate the internal and external panels to form a door, and
   pivotally attaching the door to an edge of the side wall opening.

2. The invention of claim 1 wherein the forming step includes providing an internal panel consisting of a plywood panel and a fiberglass panel and an external panel consisting of a plywood panel and a fiberglass panel, the respective internal and external panels are sandwiched on an internal core of styrofoam material to form an extended side wall of a recreational vehicle wherein a minor portion of the side wall is subsequently cut as a door blank.

3. The invention of claim 2 wherein an extruded aluminum frame member is attached about the door blank.

4. The invention of claim 3 wherein an extruded aluminum frame member is attached about the opening in the side wall.

5. The invention of claim 4 further including the step of providing a sealing member to extend about the side wall opening at a position between the door and the side wall frame member in a closed position of the door member.

6. An improved method of manufacturing a recreational vehicle with a door assembly for accessing the interior of the recreational vehicle comprising the steps of:
  forming a full side wall of a recreational vehicle with solid sheets of internal and external panel adhering to an intermediate core for strength and insulation;
  determining where a door should be positioned on the side wall;
  cutting a door blank on the side wall at the determined position;
  attaching a door frame in an opening formed by the removal of the door blank;
  attaching a perimeter frame about the door blank to encapsulate the internal and external panels to form a door; and
  pivotally connecting the door to the door frame.

7. The invention of claim 6 wherein the forming step includes providing an internal panel consisting of a plywood panel and a fiberglass panel and an external panel consisting of a plywood panel and a fiberglass panel, the respective internal and external panels are sandwiched on an internal core of styrofoam material to form an extended side wall of a recreational vehicle wherein a minor portion of the side wall is subsequently cut as a door blank.

8. The invention of claim 7 wherein an extruded aluminum frame member is attached about the door blank.

9. The invention of claim 8 wherein an extruded aluminum frame member is attached about the opening in the side wall.

10. The invention of claim 9 further including the step of providing a sealing member to extend about the side wall opening at a position between the door and the side wall frame member in a closed position of the door member.

11. An improved method of manufacturing a recreational vehicle with a door assembly for accessing the interior of the recreational vehicle comprising the steps of:
  forming a full side wall of a recreational vehicle with solid sheets of internal and external panels;
  determining where a door should be positioned on the side wall;
  cutting a door blank on the formed side wall at the determined position;
  attaching a door frame in an opening formed by the removal of the door blank;
  attaching a perimeter frame about the door blank to encapsulate the internal and external panels to form a door; and
  pivotally connecting the door to the door frame.

12. The invention of claim 11 wherein the forming step includes providing an internal panel consisting of a plywood panel and a fiberglass panel and an external panel consisting of a plywood panel and a fiberglass panel, the respective internal and external panels are sandwiched on an internal core of styrofoam material to form an extended side wall of a recreational vehicle wherein a minor portion of the side wall is subsequently cut as a door blank.

13. The invention of claim 12 wherein an extruded aluminum frame member is attached about the door blank.

14. The invention of claim 13 wherein an extruded aluminum frame member is attached about the opening in the side wall.

15. The invention of claim 14 further including the step of providing a sealing member to extend about the side wall opening at a position between the door and the side wall frame member in a closed position of the door member.

* * * * *